G. H. SARGENT.
WATER GAGE.
APPLICATION FILED NOV. 17, 1914.
1,176,251.
Patented Mar. 21, 1916.
2 SHEETS—SHEET 2.
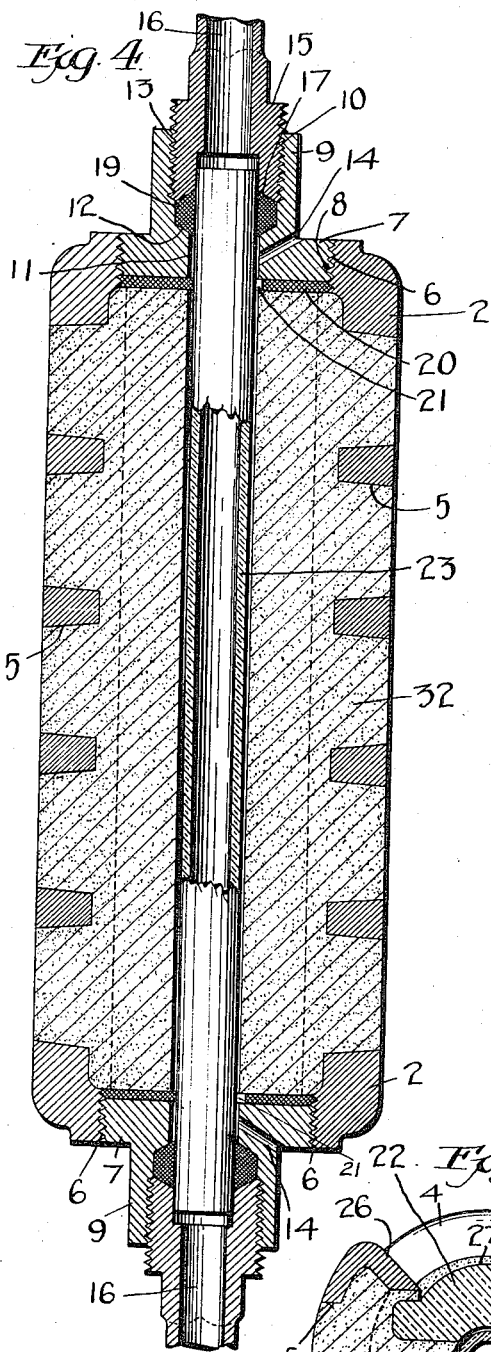
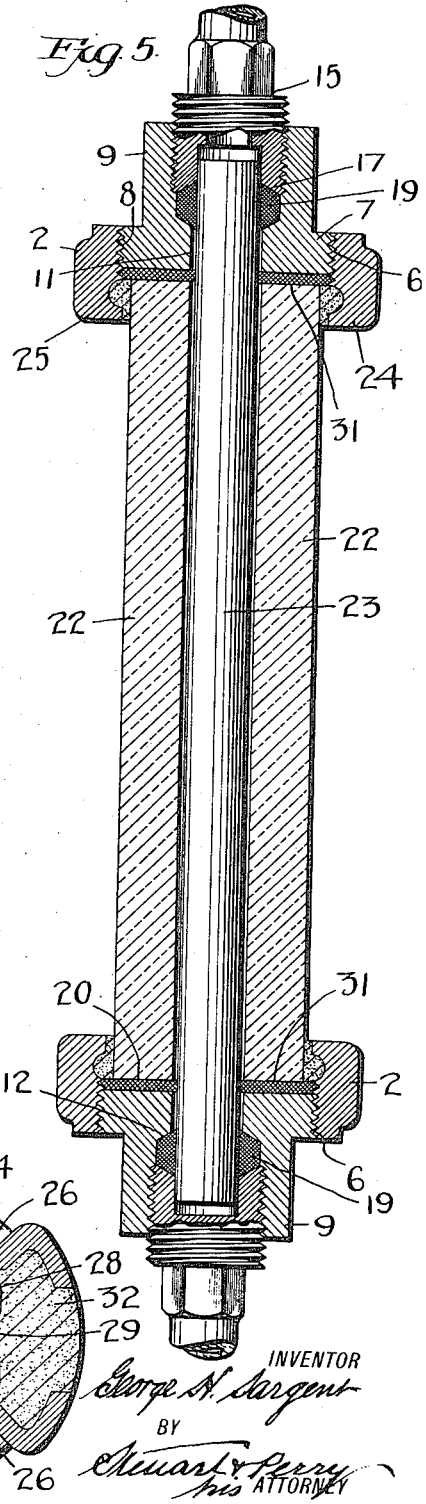
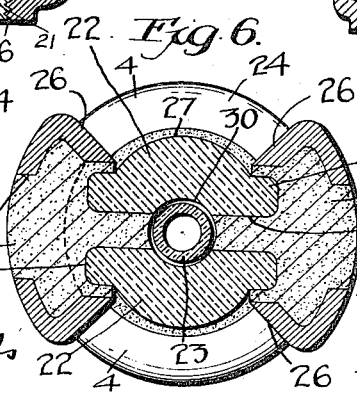
WITNESSES
INVENTOR
George H. Sargent
BY Stewart & Perry
his ATTORNEY

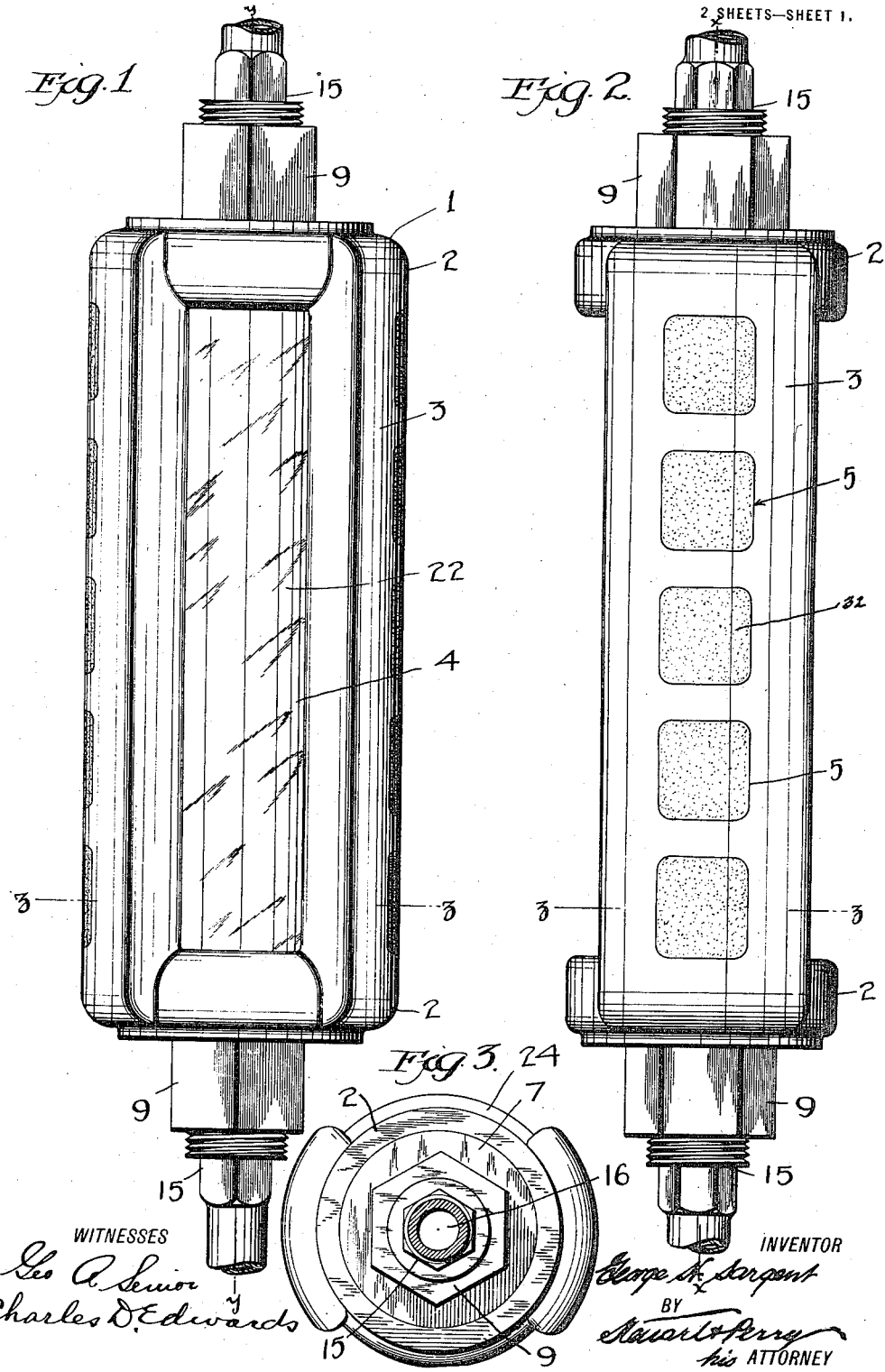

UNITED STATES PATENT OFFICE.

GEORGE H. SARGENT, OF CHICAGO, ILLINOIS.

WATER-GAGE.

1,176,251.  Specification of Letters Patent.  Patented Mar. 21, 1916.

Application filed November 17, 1914. Serial No. 872,521.

*To all whom it may concern:*

Be it known that I, GEORGE H. SARGENT, a citizen of the United States of America, residing at the city of Chicago, county of Cook, State of Illinois, have invented certain new and useful Improvements in Water-Gages, of which the following is a specification.

My invention relates to an improvement in water gages such as are employed in connection with steam boilers or kindred devices to indicate the fluid level under pressure in a container. Such devices comprise a tube of transparent glass mounted perpendicular to the horizontal plane of the normal water level and connected with the fluid container so that the level of the water is indicated in the tube. It is well known that distilled water, steam and other fluids act on the glass of such tubes to deteriorate and eventually to disintegrate the glass, operating to weaken the resisting power of the tube until eventually the glass yields to internal pressure and a fracture occurs. Such fractures are frequently accompanied by an explosion whereby the particles of glass are violently projected in association with the escaping fluid, thus endangering the life and limb of those who may be in the immediate proximity. To avoid or minimize these dangers, resort has been had to means for inclosing the inner tube within a casing for the dual purpose of protecting the inner tube from damage by external violence and also for the purpose of arresting any particles of glass and the contained fluid which may be projected by the force of the explosion. Such casings are usually made partly of metal and partly of glass so that the inner tube may be observed through the glass section of the casing. In all gages of this nature of which I have knowledge, the inner wall of the casing is spaced apart from the outer wall of the gage tube by a considerable distance, or in the alternative, the outer wall of the tube and the inner wall of the casing are brought directly in contact. I have observed in the operation of such devices that the force of an explosion incident to a fracture of the inner tube operates disastrously on the transparent section of the casing, in that the auxiliary glass or shield is itself frequently shattered and thus its usefulness destroyed, necessitating the replacement of both the inner tube and shield glass. The shield glass in such device is an expensive element; hence its replacement is costly and inconvenient, necessitating in many instances the replacement of the entire gage pending the repair, and its usefulness as a protecting shield is negatived.

The object of my present invention is to provide a casing having one or more transparent sections within which the gage tube may be contained, and through which the water level may be observed, and which will operate to so arrest the force of an explosion after a fracture of the inner tube as to prevent injury to the shield glass and so constructed that the gage tube may be readily removed after a fracture and replaced by another tube without resorting to a shop repair.

I have discovered that the disastrous results above described are minimized when the inner wall of the casing is brought in close proximity to the surface of the gage tube so that while the outer wall of the tube and the inner wall of the casing are spaced apart such space is reduced to the minimum, and that the best results are accomplished where this space is limited to approximately one sixty-fourth of an inch clearance between the outer wall of the tube and the inner wall of the casing. In naming this dimension in my specification and claims, I do not intend to limit myself absolutely to such dimension; on the contrary, it will be obvious that this dimension may be slightly varied without departing from the spirit of my invention. In all devices of the kind of which I have knowledge, the dimension referred to is much greater than that indicated and I am not aware that the discovery to which I refer has ever before been known or utilized in this connection. I do not attempt to describe or define the physical laws which operate to accomplish the result above described. I simply state that I have discovered that where a gage is made with a casing, the inner wall of which is in close proximity to the outer wall of the tube, substantially as heretofore described, that when a fracture of the inner tube occurs, the resultant explosion is so minimized as to have no perceptible effect upon the shield glass by way of fracture or otherwise.

I have illustrated my invention in the accompanying drawings referring to the parts by numerals, and designating like parts by like numerals.

Figure 1 is an elevation of one visual side of my gage, the opposite side being in all respects similar thereto. Fig. 2 is an elevation of the same gage taken on a plane perpendicular to that of Fig. 1, the opposite side of the gage being a duplicate in all respects of this view. Fig. 3 is a plane of the top and bottom of the gage. Fig. 4 is a vertical section of Fig. 2, taken on the line $x$—$x$. Fig. 5 is a vertical section of Fig. 1, taken on the line $y$—$y$. Fig. 6 is a horizontal section of Figs. 1 and 2 taken on the line $z$—$z$.

1 is a metal frame within which the elements of the casing are assembled. This metal frame comprises the following elements: two annular members at each end as 2 which are connected by straight members as 3, the latter being provided with apertures as 4 within which are mounted, as hereinafter described, the shield glasses and serve as apertures of observation. The straight members 3 are also provided with the apertures 5. These are intended to serve as ports through which a cement, hereinafter to be referred to, is introduced. The annular members 2 are provided with annular apertures internally screw-threaded as 6. The casing is closed top and bottom by means for mounting and sealing the tube within the casing. These means are represented by the disk 7 externally screw-threaded on its periphery as at 8. Extending perpendicular from this disk is the extension 9. The disk 7 and extension 9 are provided with an axial aperture as 10. This aperture at its base is of a size to receive the tube as at 11. At 12 it is formed to provide a seat for packing, and at 13 it is internally screw-threaded to receive a cap hereafter to be referred to. 14 and 14 are ports establishing communication between a chamber formed by a space between the external wall of the inner tube and the internal wall of the casing and the atmosphere, operating as means of ventilation and drain for said chamber. 15 is a screw-threaded cap provided at its base with a seat 17 to coöperate with packing. It is adapted to be run into the screw-thread 13 and is provided with a central aperture 16, which is in communication with the fluid under pressure. 19 is elastic packing adapted to be interposed between the seats 12 and 17, and when compressed to bear upon the gage tube 23. 20 is packing interposed between the disk 7 and the ends of the shield glasses hereafter to be referred to, said packing having an aperture at 21 to facilitate communication between the chamber formed between the internal wall of the casing and the tube through the ports 14 and 14. 22 and 22 are transparent shield glasses while 23 is a gage glass or inner tube. 24 are flanges forming part of the annular members 2 best seen in Fig. 5, and 25 are apertures formed between such flanges and the shield glasses. Flanges of this nature are provided at both ends of the frame being oppositely disposed and adapted to receive and hold the ends of the shield glasses. 26 and 26 are oppositely disposed flanges forming part of the straight members 3 adapted to coöperate in supporting the edges of the shield glasses. The shield glasses 22 are formed preferably with the convex faces 27, shoulders 28, plane surfaces 29 and the concavity 30, the latter being formed approximately in the arc of a section of the tube 23. The ends of the shield glasses 22 are substantially in a plane perpendicular to the longitudinal axis thereof. 32 is intended to represent cement interposed between the elements forming the casing in a manner which will be presently described.

To assemble the gage tube and its casing described, I proceed as follows: The metal frame 1 comprising the annular members 2 and straight members 3 is, as stated, the frame of the casing. To assemble the other elements within this frame I employ a mandrel in the form of a cylindrical rod of substantially the same length as the gage tube 23, but of slightly larger diameter. Where it is desired to make the space between the outer wall of the tube and the inner wall of the casing one sixty-fourth of an inch clearance, I employ a mandrel one thirty-second of an inch greater in diameter than the diameter of the glass tube. I introduce this mandrel through the screw threaded apertures 6 in the frame 1. I then introduce the shield glasses 22 and 22 between the flanges 26 and cause the same to bear upon the mandrel within the concave groove thereof 30. I then run on to the mandrel the packing 20 and screw into the screw threaded apertures 6 the disk 7, introducing the elastic packing 19 around the mandrel and screwing down the cap 15. By appropriate means, not shown, I clamp the shield glasses 22 and 22 by pressure against their convex faces so as to bind the same closely to the mandrel in the position shown in the drawings. I then screw down the disk 7 so that the packing 20 is caused to bear upon the ends of said shield glasses and hold them in position. I then screw down tightly the cap 15 thus fixing rigidly the position of the mandrel in the frame. These members being bound firmly together, I set the same in a plastic cement substantially as follows: Between the flanges 24 and the shield glasses 22, I introduce the cement as at 25, Fig. 5. I then introduce cement through the apertures 5 in the members 3 of the frame and cause the cement to occupy the space surrounding the shield glasses, except on its convex and concave surfaces. The concave surface being occupied by the mandrel, the cement is introduced until it makes contact with the mandrel and fills all of the space between the flanges 26 and shoulders 28 of the shield glasses 22. When the cement thus introduced is set and thoroughly hardened, I release the cap 15 and remove the mandrel. I then introduce the gage glass 23 and screw down the cap 15 on to the elastic packing 19. The elasticity of this packing will permit the expansion thereof uniformly under pressure so as to compensate for the difference in diameter between the mandrel and the tube and will center the tube axially within the apertures formed in the casing between the concave walls 30 of the shield glasses 22 and the concave walls formed by the molding of the cement against the surface of the mandrel. The casing thus formed is of rigid construction and provides a support for the shield glasses at the ends and along the side edges thereof, so as to render a uniform support therefor at all points available without encroaching on the field of vision. This is important to avoid a torque strain on the glass which might occur in the event of an explosive force acting thereon intermediate the supporting points, as for instance, where such glasses are supported only at their ends as is the case with some forms of construction. The flanges which I provide as 24 and 26 embrace the edges and ends of the shield glasses in coöperation with the cement and rigidly support the same within the frame, thus as stated, furnishing support for the shield glasses at all available points without encroaching on the field of vision. The double shield glasses permit observation of the water level from both sides of the gage and the sealing mechanism comprising the cap 15 and its packing permits the ready removal of the gage tube when a fracture occurs and the replacement of the same by another. The space between the gage tube and the inner wall of the casing, as previously stated, is approximately one sixty-fourth of an inch. This dimension is named, as previously stated, but it is not intended to be a limitation but rather an explanation of a desirable dimension to be employed in connection with the practice of my invention and the utilization of my discovery. It must be understood however, that there are physical limitations incident to the assembling of an apparatus such as that described, due to the imperfections in the materials necessarily employed; for instance, I find that tubular glasses vary in their sectional diameter ten thousandths of an inch, over and under, thus presenting a possible variation of twenty-thousandths of an inch. In like manner, it is impractical to make the inner surface of the casing absolutely the same. I therefore state that it is my purpose to bring these surfaces into as close proximity as physical conditions will permit, without causing them to make contact at any point. From this explanation, it will be understood that when I nominate the dimension one sixty-fourth of an inch, it is reasonable to qualify the same by the word approximately, my purpose being to reduce the clearance to a minimum for the reason that I have observed in the operation of such devices that this dimension accomplishes the best results, and that the danger of injury to the shield glass is increased in proportion to the distance that it is set away from the gage tube. My experience with this device has taught me that when the space between the inner tube and its casing is of the relatively small dimension indicated, that in some way the force of the explosion incident to the fracture of the inner tube is arrested, and fails to acquire sufficient power to overcome the resistance interposed by the casing.

It will be noted that I have provided means for draining and ventilating the intervening space between the tube and its casing represented by the ports or ducts 14. These are employed to meet a condition which arises in the operation of such devices, where there is an accumulation of moisture, possibly due to atmospheric conditions which is liable to cloud the glasses or otherwise interfere with the objects of the device. These are removed by a system of drainage and ventilation referred to, the heat causing a circulation of air which carries off the moisture.

What I claim is:

1. A gage, comprising a transparent glass tube, and a transparent casing for the same, the latter having a central aperture to receive the tube and means to mount said tube within said casing, the external wall of the tube and the internal wall of the casing spaced apart by approximately one sixty-fourth of an inch.

2. A gage, comprising a transparent glass tube and a transparent casing for the same, the latter having a central aperture to receive the tube, the external wall of the tube and the internal wall of the casing spaced apart by approximately one sixty-fourth of an inch, means to mount said tube within the casing and seal the chamber formed between them at both ends thereof with ducts through said casing one at each end thereof, leading from each end of said chamber to the atmosphere.

3. A gage, comprising a transparent glass tube, and a casing for the same, said casing having a transparent section through which fluid level may be observed and a central aperture to receive the tube, means to removably mount said tube within said casing, the external wall of the tube and the internal wall of said central aperture of the casing spaced apart by approximately one sixty-fourth of an inch substantially as and for the purposes specified.

4. A gage, comprising a transparent glass tube, and a casing for the same, said casing having a transparent section through which fluid level may be observed and a central aperture to receive the tube, means to removably mount said tube within said casing, the external wall of the tube and the internal wall of said central aperture of the casing spaced apart by approximately one sixty-fourth of an inch with ducts through said casing leading from each end of the chamber formed between said tube and its casing to the outer atmosphere, substantially as and for the purposes specified.

5. A gage, comprising a tube of transparent glass and a casing for the same, said casing consisting of a metal frame having oppositely disposed apertures through which to observe the fluid level and oppositely disposed flanges to support the shield glasses at the sides and ends thereof and oppositely disposed apertures to receive cement, shield glasses having concavities corresponding approximately with the arc of a section of the tube and shoulders to coöperate at the sides thereof with oppositely disposed flanges of the frame, means to sustain and seal the tube within its casing, cement interposed between the shield glasses and said flanges as described, the external wall of the tube and the internal wall of the casing spaced apart by approximately one sixty-fourth of an inch.

6. A gage, comprising a tube of transparent glass and a casing for the same, said casing consisting of a metal frame having oppositely disposed apertures through which to observe the fluid level and oppositely disposed flanges to support the shield glasses at the sides and ends thereof and oppositely disposed apertures to receive cement, shield glasses having concavities corresponding approximately with the arc of a section of the tube and shoulders to coöperate at the sides thereof with oppositely disposed flanges of the frame, means to sustain and seal the tube within its casing, cement interposed between the shield glasses and said flanges as described, the external wall of the tube and the internal wall of the casing spaced apart by approximately one sixty-fourth of an inch, and means to drain the chamber formed between the tube and its casing.

7. A gage, comprising a transparent glass tube, and a casing for the same, said casing consisting of a metal frame having oppositely disposed apertures through which to observe fluid level, and oppositely disposed flanges adapted to support the shield glasses (later included herein) at the sides and ends thereof and oppositely disposed apertures to receive cement, and oppositely disposed screw-threaded apertures to receive tube sealing means, the latter comprising a member externally screw-threaded having an axial aperture adapted to receive the tube and form a seat for packing and internally screw-threaded to receive a sealing nut, a sealing nut externally screw-threaded and adapted to bear on said packing, suitable packing interposed between said seat and nut, a port through said sealing member connecting the chamber formed between the casing and the tube with the atmosphere, transparent shield glasses having concavities corresponding approximately with the arc of a section of the tube and convex surfaces and shoulders, cement interposed between the shield glasses and said flanges as described, and packing interposed between the tube sealing members and the ends of the shield glasses, the external wall of the tube and the internal wall of the casing spaced apart by approximately one sixty-fourth of an inch.

8. A gage, comprising a tube of transparent glass and a casing for the same, said casing consisting of a metal frame having oppositely disposed apertures through which to observe the fluid level and oppositely disposed flanges to support the shield glasses at the sides and ends thereof and oppositely disposed apertures to receive cement, shield glasses having concavities corresponding approximately with the arc of a section of the tube and shoulders to coöperate at the sides thereof with oppositely disposed flanges of the frame, means to sustain and seal the tube within its casing, cement interposed between the shield glasses and said flanges as described.

9. A gage, comprising a tube of transparent glass and a casing for the same, said casing consisting of a metal frame having oppositely disposed apertures through which to observe the fluid level and oppositely disposed flanges to support the shield glasses at the sides and ends thereof and oppositely disposed apertures to receive cement, shield glasses having concavities corresponding approximately with the arc of a section of the tube and shoulders to coöperate at the sides thereof with oppositely disposed flanges of the frame, cement interposed between the members as described, said frame also having oppositely disposed screw threaded apertures to receive tube sealing means, the latter comprising a member externally screw threaded having an axial aperture adapted to receive the tube and form a seat for packing and internally screw-threaded to receive a sealing nut, a sealing nut externally screw-threaded and adapted to bear on said packing, suitable packing interposed between said seat and nut, a port through said sealing member connecting the chamber formed between the casing and the tube with the atmosphere and packing interposed between the tube sealing members and the ends of the shield glasses.

Signed by me at the city of Chicago, Illinois, this 14th day of November 1914.

GEORGE H. SARGENT.

Witnesses:
 FRANK G. DUNBAR,
 PHILIP W. RAYMOND.